(No Model.) 3 Sheets—Sheet 1.
P. J. CAHILL.
LATHE.
No. 370,604. Patented Sept. 27, 1887.
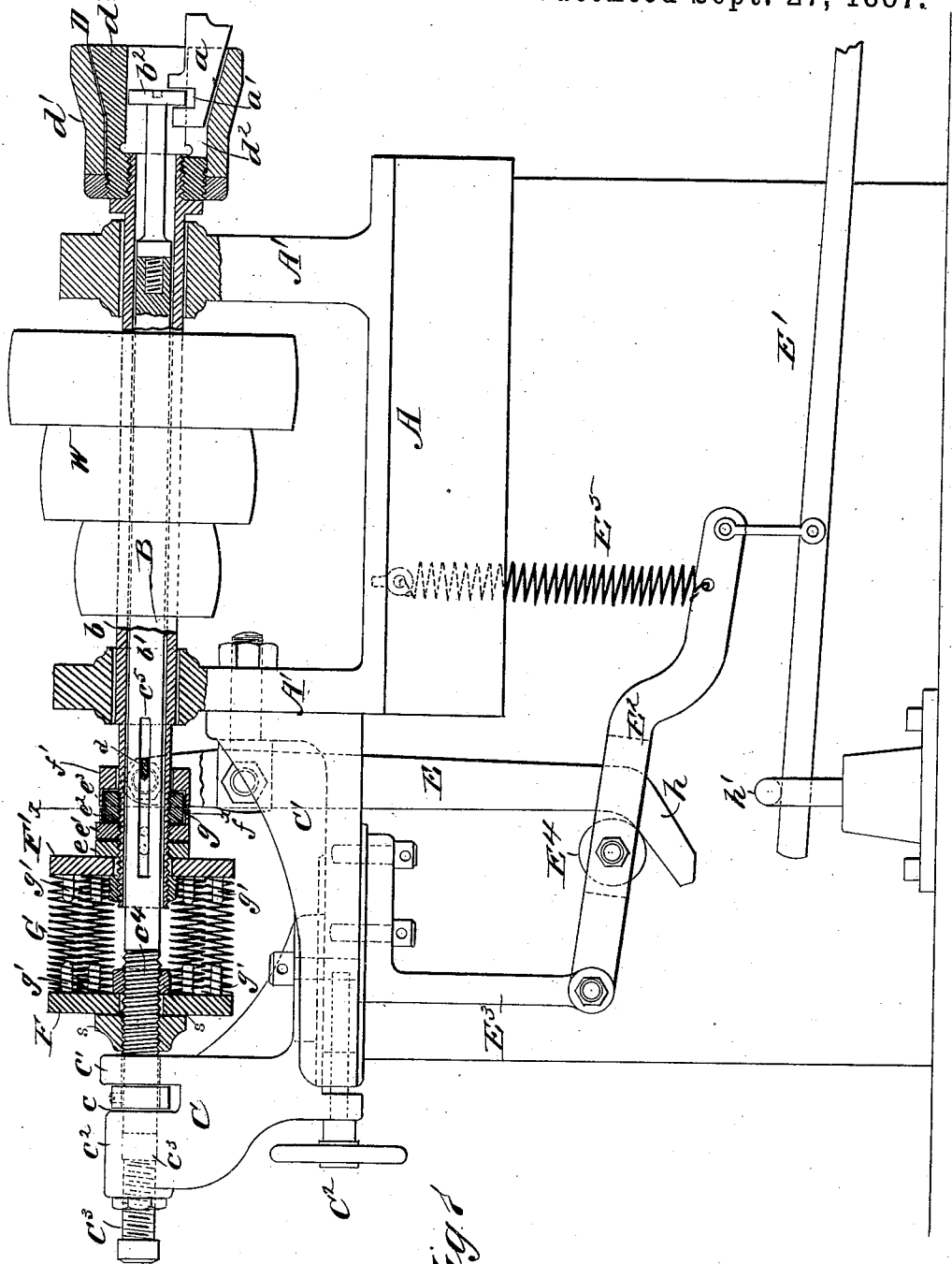
WITNESSES:
Francis McArdle
C. Sedgwick
INVENTOR:
P. J. Cahill
BY Munro & Co.
ATTORNEYS.

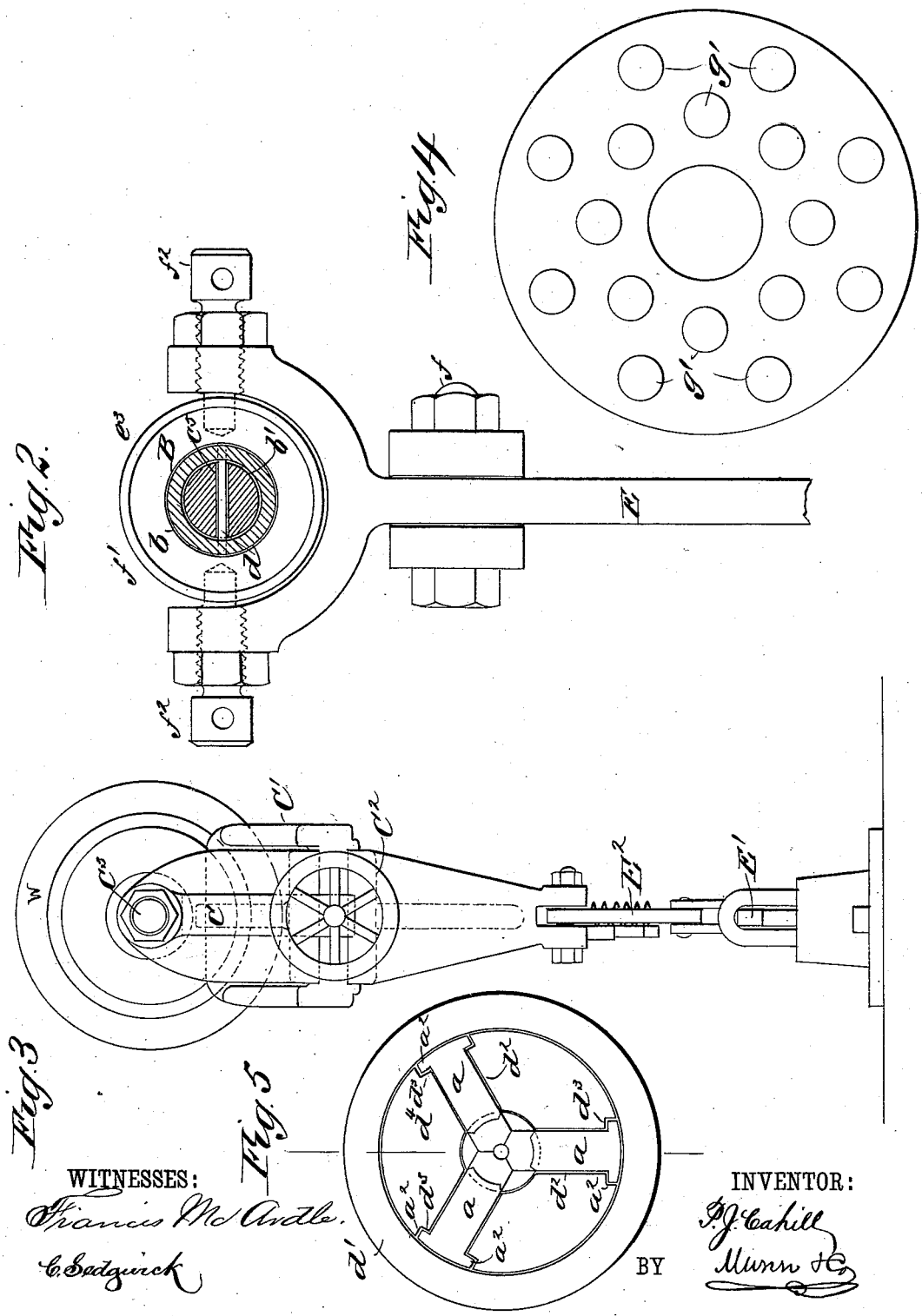

(No Model.) 3 Sheets—Sheet 3.
P. J. CAHILL.
LATHE.
No. 370,604. Patented Sept. 27, 1887.
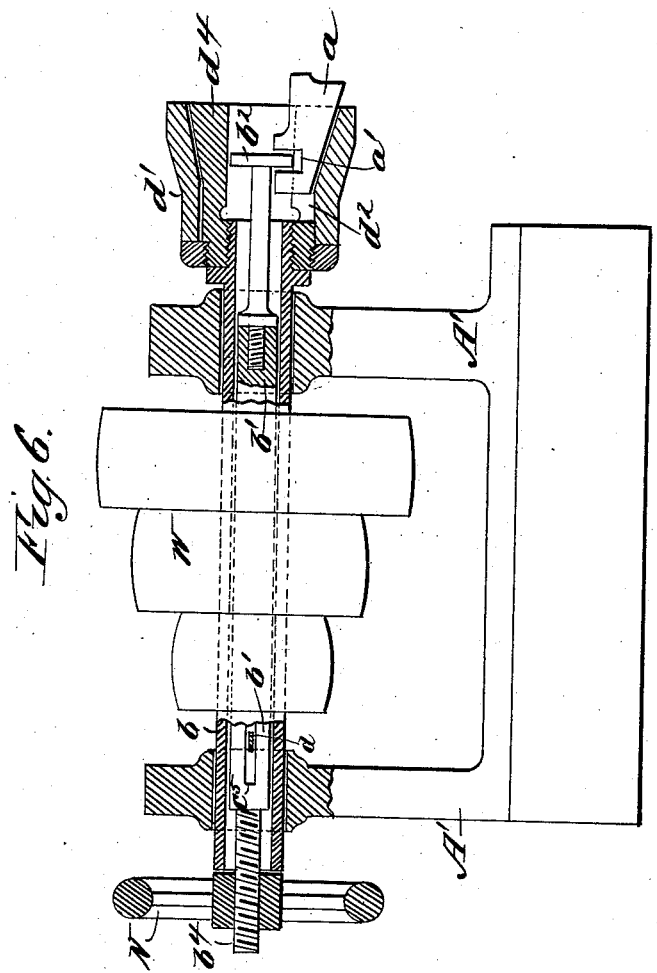
WITNESSES:
INVENTOR:

UNITED STATES PATENT OFFICE.

PATRICK J. CAHILL, OF LEEDS, MASSACHUSETTS.

LATHE.

SPECIFICATION forming part of Letters Patent No. 370,604, dated September 27, 1887.

Application filed May 21, 1887. Serial No. 238,934. (No model.)

*To all whom it may concern:*

Be it known that I, PATRICK J. CAHILL, of Leeds, in the county of Hampshire and State of Massachusetts, have invented a new and Improved Lathe, of which the following is a full, clear, and exact description.

My invention relates to the chuck and chuck-operating mechanism of lathes; and the invention consists, principally, of a sliding chuck-head operated by a hand-wheel or by a treadle and the springs for opening and closing the jaws of the chuck.

The invention also consists of a central spindle-shaft held from longitudinal movement, and to which the jaws are connected, combined with a sleeve placed on said spindle and carrying the chuck-head and acted upon by springs for closing the chuck-jaws.

The invention further consists of the special construction of the chuck and jaws, and of an adjustable rear bearing for the spindle-shaft, whereby the distance of radial movement of the jaws may be varied to suit different-sized work; and, finally, the invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a sectional elevation of my new and improved lathe. Fig. 2 is an enlarged transverse sectional elevation taken on line $x$ $x$ of Fig. 1. Fig. 3 is a rear elevation of the lathe. Fig. 4 is an enlarged view of one of the spring-plates. Fig. 5 is a front elevation of the chuck, and Fig. 6 is a sectional elevation showing a hand-wheel applied for operating the jaws of the chuck.

A represents the main part of the frame of the lathe, formed with the uprights A' A', in which the spindle B takes its bearing. An extension, C', is formed upon or attached to the main frame A, and to this extension is secured the rear bearing, C, for the spindle B, and this rear bearing is adapted to be adjusted upon the extension C' by the screw $C^2$, for regulating the extent which the jaws $a$ $a$ of the chuck will be opened or closed by the movement of the chuck-head D, produced by the lever E, tube $b$, and springs G, as hereinafter described.

The spindle B is composed of the rod or shaft $b'$ and the said tube $b$, through which the said shaft passes. The shaft $b'$ is formed or provided at its front end with a head or flange, $b^2$, with which the jaws $a$ engage, the jaws being provided with recesses $a'$ for that purpose, as shown in Fig. 1. The rear end of the shaft $b'$ is held in its bearing C by the collar $c$, held between separate rigid parts $c'$ $c^2$ of the bearing C, and said shaft is prevented from endwise movement, also, by the tail-screw $C^3$, screwed into the bearing C, and between the inner end of this screw and the rear end of the shaft $b'$ is placed the plug $c^5$, of lignum-vitæ or other hard wood, to prevent friction and heating. At $c^4$ the shaft $b'$ is screw-threaded to receive the nuts $s$ $s$ for holding the flange F, and it is slotted at $c^5$ to receive the key $d$, which locks the tube $b$ and shaft $b'$ together, so that rotary motion imparted to the tube $b$ by the pulleys W will be communicated to the shaft $b'$. The slot $c^5$ also permits the tube $b$ to be moved longitudinally upon the shaft $b'$ by the above-mentioned lever E, the treadle E', and the intermediate lever, $E^2$, as below described.

The lever E is fulcrumed at $f$, and is connected to the collar $f'$ by the side screws, $f^2 f^2$. (Shown in Fig. 2.) In the collar $f'$ works freely the tubular externally-screw-threaded tube $b$. On the rear end of the tube $b$ is secured the plate F'. Between this plate F' and the collar $f'$ are placed the two jam-nuts $e$ $e'$, the latter being rabbeted to form the flange $e^2$. The adjacent face of the collar $f'$ is also recessed to form the flange $e^3$, and between the said nut and collar in said recess is placed the collar $g$, of lignum-vitæ, to prevent heating and sticking of the parts when the treadle E' is depressed to draw back the tube $b$. Between the plates F and F' are placed the heavy coiled springs G, which exert a powerful forward pressure upon the tube $b$ and chuck-head D, causing the latter to close the jaws $a$ upon the work with sufficient power to hold it for turning. The springs are held in place between the plates F F' by the nipples $g'$. (Shown clearly in Figs. 1 and 4.)

The chuck-head D is screwed to the outer end of the tube $b$, and is made hollow to inclose the flange $b^2$ of the shaft $b'$, and the said head moves with the tube $b$, while the flange $b^2$ and jaws $a$ remain stationary, except that said jaws are given an out-and-in radial movement—that is to say, when no pressure is exerted on the treadle E' the jaws are forced together by the action of the springs G—so that they will close upon any work placed between the jaws. When the pressure is exerted upon the treadle E', the springs will be compressed and the tube $b$ and chuck-head D forced backward, causing the jaws $a$ to be moved outward to release the work. In this manner, if the work be round, it can be placed in the chuck and removed without stopping the lathe, which is one of the important features of my invention. The jaws of the chuck are practically automatic, and by operating them by a treadle both hands of the turner are free to handle the work. The inner casing, $d^4$, of the chuck-head is formed with the three radial slots $d^2\ d^2$, to permit the insertion of the jaws $a$ to engage the recesses $a'$ thereof with the flange $b^2$, and at each side of each slot $d^2$ is formed the recess $d^3\ d^3$ for the side flanges, $a^2\ a^2$, of the jaws $a$ to rest in, as shown in Fig. 5, and the said inner casing, $d^4$, of the chuck is screwed directly to the tube, and its outer surface is made slightly conical, as shown, to spread the jaws $a$ when the chuck is carried backward. The outer casing, $d'$, is screwed to the inner casing, $d^4$, and is made flaring, to correspond with the conical shape of the inner casing, $d^4$, and this outer casing being made flaring permits outward movement of the jaws $a$ when drawn backward, and when forced forward acts to force the jaws together to grasp the work.

By turning the screw C² to force the bearing C and shaft $b'$ forward the jaws $a$ may be set to grasp large work, and by reversing said screw and drawing the bearing and shaft $b'$ backward the jaws may be set for small work.

The lever E is bent at its lower end, as shown at $h$, and the intermediate lever, E², is fulcrumed in the hanger E³, and is provided with the anti-friction wheel E⁴, to run in contact with the bent portion $h$ of the lever E to operate the latter. The lever E² is held out of action by the spring E⁵. The treadle E' is fulcrumed at $h'$ and is linked to the intermediate lever, E², so that said treadle and the levers constitute a compound leverage for operating the tube $b$ and chuck.

In Fig. 6 I have shown the jaws $a$ and shaft or spindle $b'$ arranged to be operated by a hand-wheel, N, applied to the end of the shaft $b'$, which is screw-threaded, as shown at $b^4$, to receive the hand-wheel. By this arrangement I dispense with the treadle and the mechanism intermediate between it and the lathe. By turning the hand-wheel N the spindle $b'$ may be moved longitudinally for opening and closing the jaws $a$ for grasping and releasing the work.

Having thus fully described my invention, I claim as new and desire to secure by Letters Patent—

1. In a lathe, the chuck-spindle composed of a shaft and tube, in combination with the chuck-head attached to the tube, and the springs arranged to force the tube forward, substantially as described.

2. In a lathe, a chuck-spindle composed of a shaft and longitudinally-movable tube, in combination with a chuck-head, springs, and treadle, arranged to operate substantially as described.

3. In a lathe, the shaft $b'$, provided with the plate F, in combination with the tube $b$, plate F', and the springs G, placed between the said plates, substantially as and for the purposes set forth.

4. The chuck-head attached to a longitudinally-movable tube, in combination with the jaws $a$, flange $b^2$, and springs for forcing the tube and chuck-head forward, substantially as shown and described.

5. The tube $b$, placed upon the shaft $b'$, in combination with the springs G, acting in opposite directions on the said tube and shaft, substantially as described.

6. The tube $b$, placed upon the shaft $b'$, in combination with the springs G, collar $f'$, lever E, nut $c'$, and block $e^2$, of lignum-vitæ, substantially as described.

7. The tube $b$ and shaft $b'$, in combination with the springs G, acting in opposite directions upon the tube and shaft, and the block $c^3$, of lignum-vitæ, held at the rear end of the shaft, substantially as described.

8. The shaft $b'$ and jaws $a$, attached to the front end of said shaft, in combination with the longitudinally-movable tube $b$ and chuck-head D, substantially as described.

9. The shaft $b'$, holding the jaws $a$, in combination with the longitudinally-movable tube $b$, chuck-head D, and springs G, acting in opposite directions upon the shaft and tube, substantially as described.

10. The shaft $b'$, held in an adjustable bearing, C, in combination with the tube $b$, chuck-head D, and springs G, acting in opposite directions upon the shaft and tube, substantially as described.

11. The jaws $a$, notched to engage with the flange $b^2$ and formed with side flanges, $a^2$, in combination with the inner slotted conical casing, $d^4$, and the outer flaring casing, $d$, substantially as and for the purposes set forth.

12. The jaws $a$, slotted to engage with a fixed flange, in combination with the movable inner conical block, $d^4$, and outer flaring casing, $d'$, substantially as described.

PATRICK J. CAHILL.

Witnesses:
S. M. HILDRETH,
J. C. CLARKE.